United States Patent
Zehler et al.

(10) Patent No.: US 9,544,449 B1
(45) Date of Patent: Jan. 10, 2017

(54) ANALYZING SENSOR DATA OF A DEVICE COLLECTED BY A MOBILE ENDPOINT DEVICE OPERATING WITH THE DEVICE

(71) Applicant: Xerox Corporation, Norwalk, CT (US)

(72) Inventors: Peter J. Zehler, Penfield, NY (US); Gavan Leonard Tredoux, Penfield, NY (US); Premkumar Rajendran, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/807,529

(22) Filed: Jul. 23, 2015

(51) Int. Cl.
*H04N 1/00* (2006.01)
*G06F 3/12* (2006.01)

(52) U.S. Cl.
CPC .......... *H04N 1/00039* (2013.01); *G06F 3/121* (2013.01); *G06F 3/1234* (2013.01); *G06F 3/1292* (2013.01); *H04N 1/00007* (2013.01); *H04N 1/00037* (2013.01); *H04N 1/00061* (2013.01); *H04N 1/00079* (2013.01); *H04N 2201/0003* (2013.01); *H04N 2201/0094* (2013.01)

(58) Field of Classification Search
CPC ..... G06F 3/1296; G06F 3/1292; B41J 2/0451; G03G 15/703; G03G 15/55
See application file for complete search history.

(56) References Cited

U.S. PATENT DOCUMENTS

| | | | | |
|---|---|---|---|---|
| 2011/0004419 A1* | 1/2011 | Ue | ..................... | G05B 23/0254 702/34 |
| 2013/0114100 A1* | 5/2013 | Torii | ................... | G06F 11/0733 358/1.14 |
| 2015/0092221 A1* | 4/2015 | Ochi | ..................... | G06F 3/1222 358/1.14 |

* cited by examiner

*Primary Examiner* — Benny Q Tieu
*Assistant Examiner* — Haris Sabah

(57) ABSTRACT

A method, non-transitory computer readable medium and apparatus for analyzing operational sensor data of a device collected by a mobile endpoint device operating with the device are disclosed. For example, the method includes receiving the operational sensor data, a time stamp, a location of the device and a device identification (ID) from the mobile endpoint device, wherein the operational sensor data is collected by the mobile endpoint device from the device when the mobile endpoint device initiates a communication session with the device and transmitting the operational sensor data to a management service, wherein the operational sensor data is analyzed to determine a cause of a failure of the device when the device fails.

16 Claims, 4 Drawing Sheets

ANALYZING SENSOR DATA OF A DEVICE COLLECTED BY A MOBILE ENDPOINT DEVICE OPERATING WITH THE DEVICE

The present disclosure relates generally to improving operation and maintenance of a device and, more particularly, to an apparatus and method for analyzing sensor data of a device collected by a mobile endpoint device operating with the device.

BACKGROUND

Some devices may operate best under certain conditions. When certain environmental conditions are outside of desired operating conditions, the device may malfunction or operate inefficiently. However, the operating conditions near the devices are often not monitored. As a result, when the device fails, troubleshooting may not resolve the failure completely.

In addition, some devices may operate without a communication connection to a management service for the devices. For example, these devices may operate without any monitoring of how the device is performing. Thus, without communication capabilities these devices remain isolated and cannot be part of the management service.

SUMMARY

According to aspects illustrated herein, there are provided a method, non-transitory computer readable medium and apparatus for analyzing operational sensor data of a device collected by a mobile endpoint device operating with the device. One disclosed feature of the embodiments is a method that receives the operational sensor data, a time stamp, a location of the device and a device identification (ID) from the mobile endpoint device, wherein the operational sensor data is collected by the mobile endpoint device from the device when the mobile endpoint device initiates a communication session with the device and transmits the operational sensor data to a management service, wherein the operational sensor data is analyzed to determine a cause of a failure of the device when the device fails.

Another disclosed feature of the embodiments is a non-transitory computer-readable medium having stored thereon a plurality of instructions, the plurality of instructions including instructions which, when executed by a processor, cause the processor to perform operations that receive the operational sensor data, a time stamp, a location of the device and a device identification (ID) from the mobile endpoint device, wherein the operational sensor data is collected by the mobile endpoint device from the device when the mobile endpoint device initiates a communication session with the device and transmit the operational sensor data to a management service, wherein the operational sensor data is analyzed to determine a cause of a failure of the device when the device fails.

Another disclosed feature of the embodiments is an apparatus comprising a processor and a computer-readable medium storing a plurality of instructions which, when executed by the processor, cause the processor to perform operations that receive the operational sensor data, a time stamp, a location of the device and a device identification (ID) from the mobile endpoint device, wherein the operational sensor data is collected by the mobile endpoint device from the device when the mobile endpoint device initiates a communication session with the device and transmit the operational sensor data to a management service, wherein the operational sensor data is analyzed to determine a cause of a failure of the device when the device fails.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for analyzing operational sensor data of a device collected by a mobile endpoint device operating with the device. As discussed above, some devices may operate best under certain conditions. When certain environmental conditions are outside of desired operating conditions, the device may malfunction or operate inefficiently. However, the operating conditions near the devices are often not monitored. As a result, when the device fails, troubleshooting may not resolve the failure completely.

In addition, some devices may operate without a communication connection to a management service for the devices. For example, these devices may operate without any monitoring of how the device is performing. Thus, without communication capabilities these devices remain isolated and cannot be part of the management service.

Embodiments of the present disclosure leverage the ubiquity of mobile endpoint devices to collect operational sensor data at a location of a device that is part of a management service. The operational sensor data along with additional information (e.g., a time stamp or other information associated with the device) can be forwarded to an aggregation service provider. The aggregation service provider may then forward the collected data and other information to a management service that manages the device. At a later time when a failure of the device is detected, the management service may correlate the operational sensor data that was collected to correlate the operational sensor data to the failure to determine a cause of the failure of the device.

Figure 1:
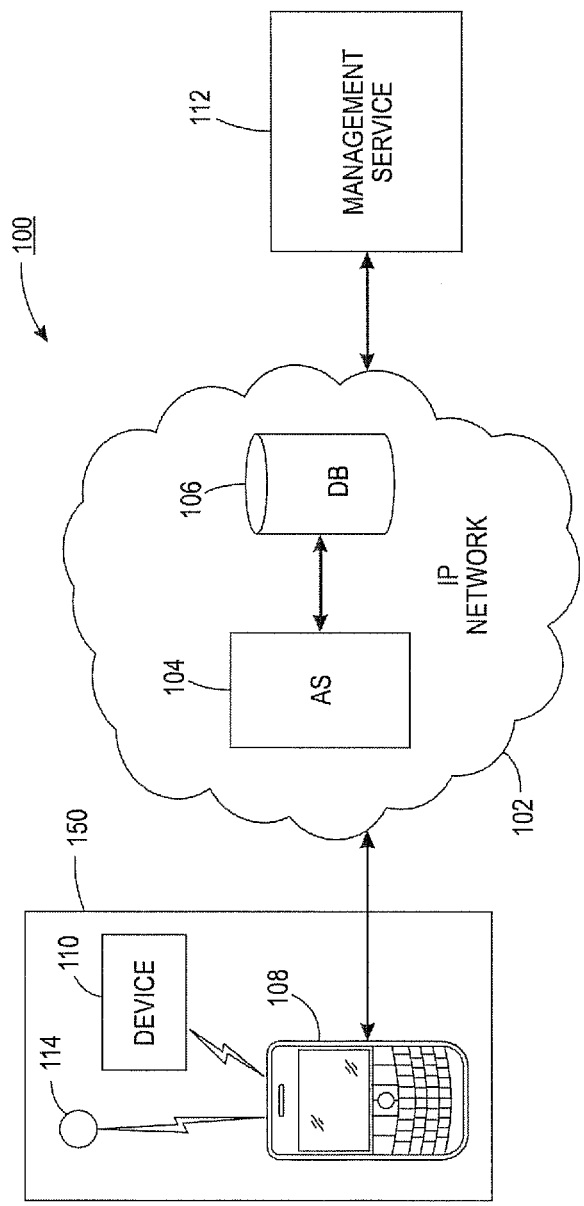
FIG. 1 illustrates an example block diagram of a communication network of the present disclosure.

FIG. 1 illustrates an example communication network 100 of the present disclosure. In one embodiment, the communication network 100 may include an Internet Protocol (IP) network 102. The IP network 102 may include an application server (AS) 104 and a database (DB) 106. Although only a single AS 104 and a single DB 106 are illustrated in FIG. 1, it should be noted that any number of application servers and databases may be deployed.

In one embodiment, the AS 104 may be deployed as a dedicated computer, for example the computer in FIG. 4 and described below, for performing the functions described in FIG. 2 and described below. In one embodiment, the AS 104 may be an aggregation server that is owned and operated by an aggregation service provider. For example, the aggregation service provider may collect operational sensor data for a device 110 that is managed by a management service 112 and transmit the operational sensor data to the management service 112 that is a subscriber to the aggregation services and manages the device 110.

In one embodiment, the DB 106 may store information that is collected by a mobile endpoint device 108. The information may include, for example, operational sensor data, a time stamp, a location of a device 110, a device identification (ID), and the like. The DB 106 may store information regarding which management services 112 have subscribed to an aggregation service and which devices 110 belong to which management services 112.

In one embodiment, the management service 112 may be a service provider that manages devices, e.g., the device 110, for a company or enterprise. For example, the management service 112 may be a managed print service (MPS), and the like. Although only a single management service 112 is illustrated in FIG. 1, it should be noted that any number of management services 112 may subscribe with the aggregation service provider to receive operational sensor data for one or more devices 110 of the management service 112.

As noted above, the management service 112 may manage, monitor or service one or more devices 110 for a company or enterprise. In one embodiment, the device 110 may be a multi-function device (MFD), a thermostat, an appliance, and the like. The device 110 may operate most efficiently under certain parameters measured by a sensor (e.g., operational sensor parameters). The operational sensor parameters may include environmental conditions (e.g., temperature, humidity level, dust level, radio frequency interference, vibrations, etc.), a location (e.g., a location in a corner, a location in an open area, a particular floor of a building, near metal walls, etc.), device parameters (e.g., whether the device is level, how often the device operates, what types of jobs are being performed by the device, etc.), or any other sensor data that may be relevant (e.g., accelerometer data, a wireless communication signal strength (e.g., a Wireless Fidelity (Wi-Fi) signal, an Long-Term Evolution (LTE) signal, and the like), an ambient light level, an image of the device 110, a photograph of the device 110 and surroundings, and the like).

In one embodiment, the operational sensor parameters may be measured or obtained by a sensor. In one embodiment, the sensor may be within a mobile endpoint device 108 that attempts to pair with the device 110. For example, the mobile endpoint device 108 may include sensors that may be able to obtain Wi-Fi signal strength, accelerometer data, vibration data, an amount of ambient light data, take a photograph, and the like. In another embodiment, the sensor may be within the device 110. For example, the sensors may be able to determine a temperature, whether the device 110 is level, how of the device operates, and the like.

In another embodiment, the sensor may be one or more external sensors 114 that are located near or in close proximity to the device 110. In other words, the sensor 114 may be at a same location 150 that the device 110 is located. The one or more external sensors 114 may collect operational parameters such as humidity, magnetic interference, RF interference, location information, dust levels, or any other operational parameters that cannot be obtained by the mobile endpoint device 108 or the device 110. The sensor 114 may have wireless communication capabilities and may transmit operational sensor data that is collected to the mobile endpoint device 108 over a wireless connection (e.g., Bluetooth, Wi-Fi, LAN, RF signals, and the like).

In one embodiment, a mobile endpoint device 108 may attempt to initiate a communication session with the device 110. In one embodiment, the communication session may be a pairing request to control the device 110. The mobile endpoint device 108 may be any type of mobile endpoint device 108 such as, for example, a smartphone, a tablet computer, a laptop computer, and the like. When the mobile endpoint device 108 attempts to pair with the device 110, the mobile endpoint device 108 may collect operational sensor data from one or more sensors within the mobile endpoint device 108, within the device 110, and/or the one or more external sensors 114.

For example, the mobile endpoint device 108 may be a smartphone and the device 110 may be an MFD. The smartphone may use tap to print technology to tap or read a code on the MFD to pair with the MFD and print a document. When the pairing is initiated by the smartphone, the smartphone may collect operational sensor data from one or more of: the smartphone itself, the MFD or the external sensor 114.

In another example, the mobile endpoint device 108 may be a smartphone and the device 110 may be a thermostat. The smartphone may initiate a pairing with the thermostat to remotely control the thermostat. When the pairing is initiated by the smartphone, the smartphone may collect operational sensor data from one or more of the smartphone itself, the thermostat or the external sensor 114.

It should be noted that although the examples above describe a single mobile endpoint device 108 collecting operational sensor data from a single device 110 that any number mobile endpoint devices 108 may be collecting operational sensor data from any number of devices 110 at the same time or at different times. In other words, the AS 104 may be receiving operational sensor data for a plurality of different devices 100 from a plurality of different mobile endpoint devices 108 continuously.

In one embodiment, in addition to the operational sensor data, the mobile endpoint device 108 may collect additional information such as, for example, a time stamp, a location of the device 110 (e.g., using the global positioning system (GPS) data on the mobile endpoint device 108), and a device identification (ID). For example, the device ID may be a media access control (MAC) ID of the device 110, a user selected name for the device 110, or any other ID that can be used to identify a particular device 110. The additional information may be used with the operational sensor data to correlate the operational sensor data to a failure of the device 110 and determine a cause of the failure, as discussed below.

In one embodiment, the mobile endpoint device 108 may then transmit the operational sensor data that is collected to the AS 104 of the aggregation service provider when a trigger is detected. For example, the trigger may be a time period. For example, the mobile endpoint device 108 may collect data from a plurality of different device 110 and periodically transmit the data to the aggregation service provider (e.g., every hour, every day, and the like). In another example, the trigger may be when a particular wireless communication protocol (e.g., a Wi-Fi connection, a cellular connection, a wide area connection, a long term evolution (LTE) connection, and the like) is detected. In other words, the operational sensor data may be collected from the device 110 over a first communication protocol and the operational sensor data may be transmitted to the AS 104 over a second communication protocol that is different from the first communication protocol. For example, the device 110 may communicate with the mobile endpoint device 108 over a local wireless connection (e.g., Bluetooth). At a later time, when the mobile endpoint device 108 detects a Wi-Fi network, the mobile endpoint device 108 may transmit the operational sensor data to the AS 104.

In another embodiment, the mobile endpoint device 108 may transmit the operational data immediately. In other words, the trigger may be when reception of the operational sensor data is complete.

In one embodiment, the device 110 may be managed by the management service 112. The management service 112 may have subscribed to operational sensor data aggregation services provided by the aggregation service provider. The device 110 may not have any communication capabilities with the management service 112 that is located remotely from the device 110. In other words, the device 110 may only be capable of communicating locally with the mobile endpoint device 108. However, using the embodiments of the present disclosure, the management service 112 may still be able to manage the device 110 using the operational data that is collected by the mobile endpoint device 108, sent to the AS 104 of the aggregation service provider and received from the AS 104.

For example, the management service 112 may receive an indication that the device 110 has failed. The indication may be from the mobile endpoint device 108. For example, the mobile endpoint device 108 may attempt to pair with the device 110 and the device 110 may fail to pair with the mobile endpoint device 108. In another example, the mobile endpoint device 108 may successfully pair with the device 110, but the device 110 may fail to perform a print job that the mobile endpoint device 108 has sent. In another example, the mobile endpoint device 108 may successfully pair with the device 110, but the device 110 may fail to change a temperature setting as instructed by the mobile endpoint device 108. When the failure is observed by the mobile endpoint device 108, the mobile endpoint device 108 may send a notification with the operational sensor data to the AS 104. The aggregation service provider may then forward the notification to the management service 112 to indicate that the device 110 has failed.

The notification to the management service 112 may initiate an analysis on the operational sensor data to correlate the operational sensor data to the failure of the device 110. For example, the correlation may be performed to determine a cause of the failure. In one example, the failure may be at a time the operational sensor data is collected by the mobile endpoint device 108. For example, the mobile endpoint device 108 may have been unable to pair with the device 110. The management service 112 may analyze the operational sensor data to determine that RF interference is causing the failure to pair with the mobile endpoint device 108.

In another example, the failure may be at a later time after operational sensor data is collected over a period of time. For example, the failure may be that the device 110 repeatedly jams. The management service 112 may analyze the operational sensor data to determine that a high level of humidity is causing paper to roll and jam the device 110.

In another example, the management service 112 may analyze the operational sensor to determine that high vibration levels are causing the level of the device 110 to shift over time leading to the periodic paper jams in the device 110. In other words, environmental conditions that are collected as part of the operational sensor data may be correlated to other operational sensor data to determine a cause of the failure. Said another way, environmental conditions that may otherwise have been unrelated to the operation of the device 110 may be transformed into a cause of failure of the device 110.

Figure 2:
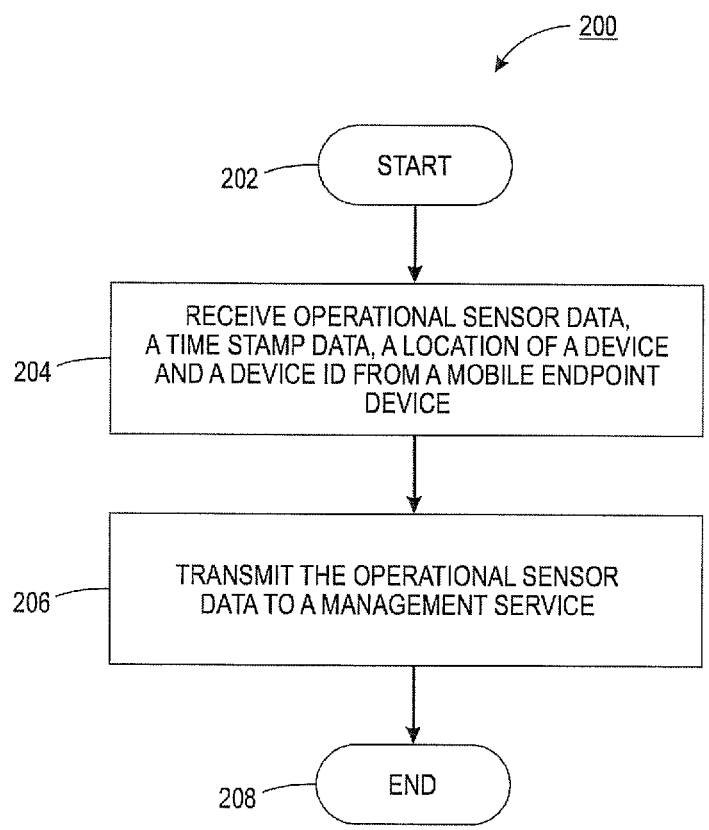
FIG. 2 illustrates a flowchart of an example method for analyzing operational sensor data of a device collected by a mobile endpoint device operating with the device.

FIG. 2 illustrates a flowchart of a method 200 for analyzing operational sensor data of a device collected by a mobile endpoint device operating with the device. In one embodiment, one or more steps or operations of the method 200 may be performed by the AS 104 or a computer as illustrated in FIG. 4 and discussed below.

At block 202 the method 200 begins. At block 204, the method 200 receives operational sensor data, a time stamp data, a location of a device and a device identification (ID) from a mobile endpoint device. For example, when the mobile endpoint device initiates a communication session with the device over a local wireless communication protocol (e.g., Bluetooth, Wi-Fi, and the like), the mobile endpoint device may collect operational sensor data, as discussed above.

In one embodiment, the operational sensor data may be received from the mobile endpoint device when a trigger is detected by the mobile endpoint device. As discussed above, the trigger may be a predefined time period, when a particular wireless communication connection is detected, when the collection of operational sensor data is complete, and the like.

At block 206, the method 200 transmits the operational sensor data to a management service. In one embodiment, the operational sensor data may correlate the operational sensor data to reported faults and/or failures. If a correlation is detected, the operational sensor data may be analyzed by the management service to determine a cause of a failure of the device when the device fails. At block 208 the method 200 ends.

Figure 3:
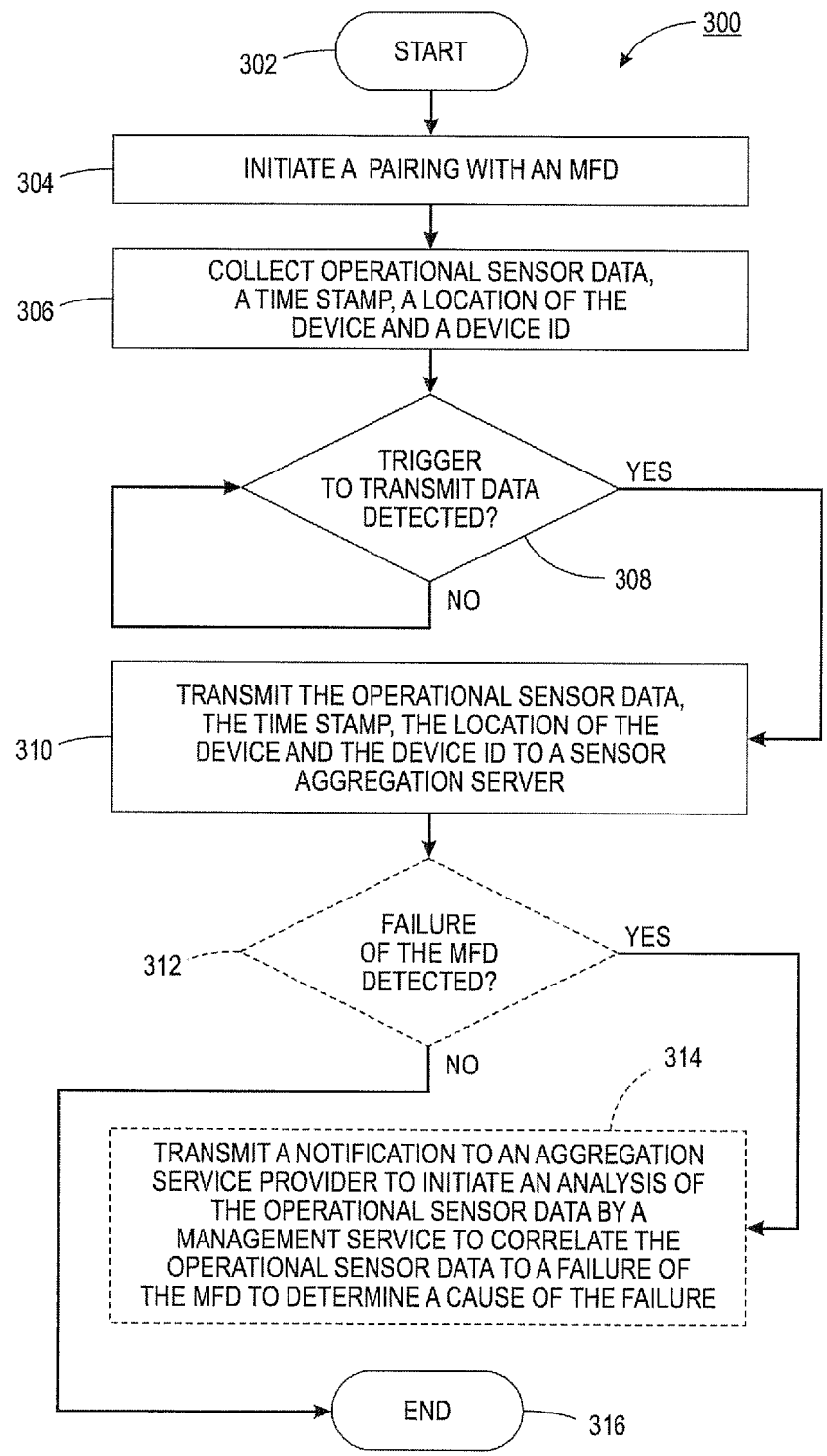
FIG. 3 illustrates a flowchart of an example method for analyzing operational sensor data of a multi-function device (MFD) collected by a mobile endpoint device operating with the MFD.

FIG. 3 illustrates a flowchart of an example method 300 for analyzing operational sensor data of a multi-function device (MFD) collected by a mobile endpoint device operating with the MFD. In one embodiment, one or more steps, blocks, or operations of the method 300 may be performed by the mobile endpoint device 108 or a computer as illustrated in FIG. 4 and discussed below.

At block 302 the method 300 begins. At block 304, the method 300 initiates a pairing with an MFD. For example, the mobile endpoint device may initiate a pairing with the MFD to control the MFD remotely (e.g., a tap to print).

At block 306, the method 300 collects operational sensor data, a time stamp, a location of the device and a device ID. In one embodiment, the operational sensor data may include environmental conditions (e.g., temperature, humidity level, dust level, radio frequency interference, vibrations, etc.), a location (e.g., a location in a corner, a location in the open, a particular floor, near metal walls, etc.), device parameters (e.g., whether the device is level, how often the device operates, what types of jobs are being performed by the device, etc.), or any other sensor data that may be relevant (e.g., accelerometer data, a wireless communication signal strength (e.g., a Wi-Fi signal, an LTE signal, and the like), an ambient light level, an image of the device 110, a photograph of the device 110 and surroundings, and the like).

In one embodiment, the operational sensor data may be measured by one or more sensors in the MFD. In another embodiment, the operational sensor data may be measured by one or more sensors in the mobile endpoint device. In another embodiment, the operational sensor data may be measured by one or more external sensors located in a same location at the MFD. In other words, the external sensors are located in close proximity to, near to or attached to the MFD.

In one embodiment, the operational sensor data may be measured by all, or any combination of, the one or more sensors on the MFD, the one or more sensors on the mobile endpoint device or the one or more external sensors.

At block 308, the method 300 determines if a trigger to transmit data is detected. As discussed above, the trigger may be a predefined time period, when a particular wireless communication connection is detected, when the collection of operational sensor data is complete, and the like. If the trigger is not detected, then the method 300 may loop at block 308 until the trigger is detected. When the trigger is detected, the method 300 may proceed to block 310.

At block 310, the method 300 transmits the operational sensor data, the time stamp, the location of the device and the device ID to a sensor aggregation server. In one embodiment, the mobile endpoint device may collect operational sensor data, the time stamp, the location of the device and the device ID for a plurality of different devices between transmissions to the sensor aggregation server.

In one embodiment, after the operational sensor data is transmitted to the aggregation server, and conversely, the aggregation server transmits the operational sensor data to a management service that is a subscriber of the aggregation services, the management service may be responsible for monitoring operation of the devices. For example, the devices may have wireless or wired communication capabilities with the management service to report faults and/or errors, which can cause the management service to analyze the operational sensor data.

At optional block 312, the method 300 may determine if a failure of the MFD is detected. For example, the MFD may only have local communications capabilities and be incapable of communicating with the management service. As a result, the failure may be optionally detected by the mobile endpoint device while interacting with the MFD. The failure may be detected from the initiation of the pairing request to a failure of the MFD to perform a job or a function requested by the mobile endpoint device. In one embodiment, the failure may be detected after an initial interaction between the mobile endpoint device and the MFD or after a period of time or several interactions between the MFD and the mobile endpoint device and/or other mobile endpoint devices. If a failure of the MFD is not detected, the method 300 may proceed to block 316. When a failure of the MFD is detected, the method 300 may proceed to block 314.

At optional block 314, the method 300 may transmit a notification to an aggregation service provider to initiate an analysis of the operational sensor data by a management service to correlate the operational sensor data to a failure of the MFD to determine a cause of the failure. The notification may indicate to the aggregation service provider that the device has failed. The aggregation service provider may then determine which management service manages the device that has failed and determine if the management service is a subscriber of the operational sensor data aggregation service. If the management service is a subscriber, the aggregation service provider may then send the notification to the management service so that the management service may initiate an analysis of the operational sensor data. At block 316 the method 300 ends.

It should be noted that although not explicitly specified, one or more steps, functions, or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2 and 3 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer or a device. For example, a device without any networking capability may be monitored by a management service to automatically identify failures and resolve failures in the device. In addition, the embodiments of the present disclosure transform operational sensor data that typically provides information about an environmental condition into a cause of a failure of the device, as discussed above. Notably, no previous machine or computer was capable of performing the functions described herein as the present disclosure provides an improvement in the technological arts of managed services of devices (e.g., managed print services).

Figure 4:
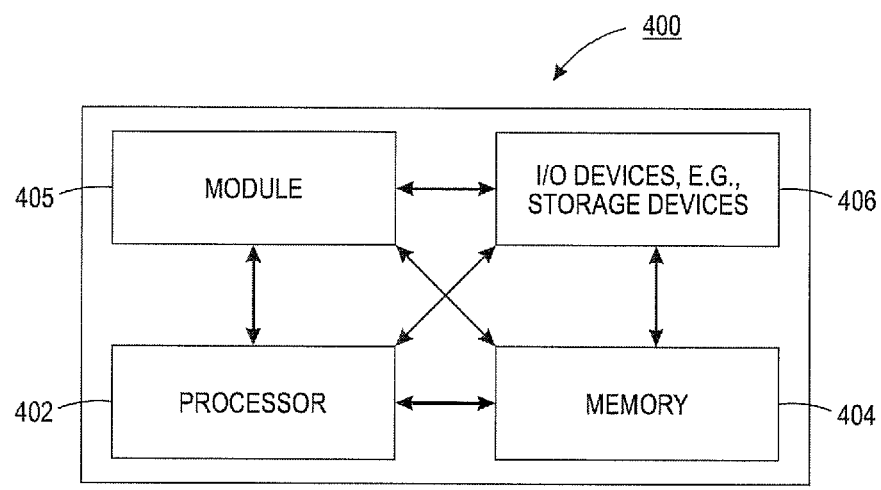
FIG. 4 illustrates a high-level block diagram of a computer suitable for use in performing the functions described herein.

FIG. 4 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to improve monitoring of devices to automatically identify failures and resolve failures in the device, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for analyzing operational sensor data of a device collected by a mobile endpoint device operating with the device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for analyzing operational sensor data of a device collected by a mobile endpoint device operating with the device (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for analyzing operational sensor data of a device collected by a mobile endpoint device operating with the device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for analyzing operational sensor data of a device collected by a mobile endpoint device operating with the device, the method comprising:
    receiving, by a management service that is located remotely from the device, an operational sensor data, a time stamp, a location of the device and a device identification (ID), via a global positioning system data on the mobile endpoint device, from the mobile endpoint device, wherein the operational sensor data comprises an environmental condition, which include at least one of: a temperature, a humidity level, a wireless communication signal strength, an ambient light level and is collected by the mobile endpoint device when the mobile endpoint device initiates a communication session with the device, wherein the communication session comprises a pairing request between the mobile endpoint device and the device to allow the mobile endpoint device to control the device, wherein the device does not have any communication capability with the management service; and
    transmitting, by the mobile endpoint device, the operational sensor data to the management service, wherein the operational sensor data is analyzed by the management service to determine a cause of a failure of the device when the device fails.

2. The method of claim 1, wherein the device comprises a multi-function device.

3. The method of claim 1, wherein the operational sensor data is collected from a sensor in the device.

4. The method of claim 1, wherein the operational sensor data is collected from a sensor that is at the location of the device and is external to the device and external to the mobile endpoint device.

5. The method of claim 1, wherein the operational sensor data is collected by the mobile endpoint device at the location of the device.

6. The method of claim 1, wherein the mobile endpoint device collects from the device, the operational sensor data the time stamp, the location of the device and, the device ID over a first communication protocol and the mobile endpoint device transmits the operational sensor data, the time stamp, the location of the device and the device ID to the management service over a second communication protocol different than the first communication protocol.

7. A non-transitory computer-readable medium storing a plurality of instructions, which when executed by a processor, cause the processor to perform operations for analyzing operational sensor data of a device collected by a mobile endpoint device operating with the device, the operations comprising:
    receiving by a management service that is located remotely from the device, an operational sensor data, a time stamp, a location of the device, and a device identification (ID) via a global positioning system data on the mobile endpoint device, from the mobile endpoint device, wherein the operational sensor data comprises an environmental condition which include at least one of: a temperature, a humidity level, a wireless communication signal strength, an ambient light level and is collected by the mobile endpoint device when the mobile endpoint device initiates a communication session with the device, wherein the communication session comprises a pairing request between the mobile endpoint device and the device to allow the mobile endpoint device to control the device, wherein the device does not have any communication capability with the management service; and
    transmitting, by mobile endpoint device, the operational sensor data to the management service, wherein the operational sensor data is analyzed by the management service to determine a cause of a failure of the device when the device fails.

8. The non-transitory computer-readable medium of claim 7, wherein the device comprises a multi-function device.

9. The non-transitory computer-readable medium of claim 7, wherein the operational sensor data is collected from a sensor in the device.

10. The non-transitory computer-readable medium of claim 7, wherein the operational sensor data is collected from a sensor that is at the location of the device and is external to the device and external to the mobile endpoint device.

11. The non-transitory computer-readable medium of claim 7, wherein the operational sensor data is collected by the mobile endpoint device at the location of the device.

12. The non-transitory computer-readable medium of claim 7, wherein the mobile endpoint device collects from the device, the operational sensor data, the time stamp, the location of the device and the device ID over a first communication protocol and the mobile endpoint device transmits the operational sensor data, the time stamp, the location of the device and the device ID to the management service over a second communication protocol different than the first communication protocol.

13. A method for analyzing operational sensor data of a multi-function device (MFD) collected by a mobile endpoint device operating with the MFD, the method comprising:

initiating, by the mobile endpoint device, a pairing with the MFD to control the MFD, wherein the MFD does not have any communication capability with a management service that is located remotely from the MFD;

collecting, by the mobile endpoint device, an operational sensor data, a time stamp, a location of the device, and a device identification (ID) via a global positioning system data on the mobile endpoint device, wherein the operational sensor data comprises an environmental condition which include at least one of: a temperature, a humidity level, a wireless communication signal strength, an ambient light level;

transmitting, by the mobile endpoint device, the operational sensor data, the time stamp, the location of the device and the device identification (ID) to a sensor aggregation server of a sensor aggregation service provider;

detecting, by the mobile endpoint device, a failure of the MFD on a subsequent pairing attempt; and transmitting, by the mobile endpoint device, a notification to the sensor aggregation server of the sensor aggregation service provider that an operation of the MFD has failed to initiate an analysis of the operational sensor data by the management service that services the MFD that received the operational sensor data, the time stamp, the location of the device and the device identification (ID) from the sensor aggregation server to correlate the operational sensor data to the failure of the MFD.

14. The method of claim 13, wherein the operational sensor data is collected from a sensor in the MFD.

15. The method of claim 13, wherein the operational sensor data is collected from a sensor that is at the location of the MFD and is external to the MFD and external to the mobile endpoint device.

16. The method of claim 13, wherein the operational sensor data is collected by the mobile endpoint device at the location of the device.

\* \* \* \* \*